United States Patent [19]

Ernst

[11] Patent Number: 4,606,067
[45] Date of Patent: Aug. 12, 1986

[54] DEVICE FOR RECOGNIZING FAR-AWAY ELECTRO-MAGNETICALLY RADIATING OBJECTS

[75] Inventor: Valentin Ernst, Überlingen, Fed. Rep. of Germany

[73] Assignee: Bodenseewerk Gerätetechnic GmbH, Überlingen, Fed. Rep. of Germany

[21] Appl. No.: 462,030

[22] Filed: Jan. 28, 1983

[30] Foreign Application Priority Data

Feb. 3, 1982 [DE] Fed. Rep. of Germany ....... 3203528

[51] Int. Cl.⁴ .............................................. G06K 9/00
[52] U.S. Cl. ..................................... 382/42; 343/378; 382/58
[58] Field of Search .................................. 382/27–29, 382/32, 35, 42–43, 65, 68, 58; 250/208, 209, 578; 356/348, 357–360, 376; 343/378–384; 455/132, 137, 272, 273; 364/604, 728, 819

[56] References Cited

U.S. PATENT DOCUMENTS

| | | | |
|---|---|---|---|
| 3,074,634 | 1/1963 | Gamo | 382/65 |
| 3,130,408 | 4/1964 | Kumano | 343/378 |
| 3,956,749 | 5/1976 | Magorian | 343/378 |
| 3,969,699 | 7/1976 | McGlaughlin | 382/68 |
| 4,198,704 | 4/1980 | Munson | 343/378 |
| 4,209,780 | 6/1980 | Fenimore et al. | 382/42 |

Primary Examiner—Leo H. Boudreau
Attorney, Agent, or Firm—Lee, Smith & Zickert

[57] ABSTRACT

The device operates after the principle of an intensity interferometer. It contains a plurality of detectors arranged two-dimensionally in fixed relative positions. The signals from the detectors are correlated in pairs. A pattern formed from the correlation values is compared with patterns of the same kind from known objects.

11 Claims, 4 Drawing Figures

DEVICE FOR RECOGNIZING FAR-AWAY ELECTRO-MAGNETICALLY RADIATING OBJECTS

The invention relates to a device for recognizing far away electromagnetically radiating objects, comprising
(a) a plurality of detectors responding to the radiation of the object and arranged two-dimensionally in fixed relative positions, and
(b) a target object measurement circuit to which the signals from the detectors are supplied and which compare a pattern derived from the signals with patterns of known objects.

Prior art systems for automatically recognizing objects comprise a grid of detectors on which an optical image of a field of view containing the object is generated by an optical imaging system. The detector signals form a pattern of gray or color values which corresponds to this optical image. This pattern is compared by a computer with stored patterns of the same kind of known objects. Thereby the object observed can be associated with a certain class of objects, thus can be "recognized".

With very far away objects the object recognition through an optical system presents problems regardless of whether the object is observed visually or through a grid of detectors. These problems have the following causes:

The resolution of an optical imaging system depends on the aperture thereof. Optical systems having very large apertures are very expensive. In addition their power is impeded by thermal influences and problems of mechanical stability, and is eventually limited thereby. A further factor which makes the recognition of far away objects difficult is the blur which results from uncontrolled movements of the optical imaging system (rocking) or from uncontrollable refraction in the generally turbulent atmosphere (twinkling).

An instrument designated "intensity interferometer" is known for determining the diameter of fixed stars (R. Hanbury Brown "The Intensity Interferometer, its Application to Astronomy", Publishers Taylor and Francis Ltd, London). Therein two photoelectric detectors, which are exposed to the radiation of a fixed star via two concave mirrors directed to this fixed star, are connected to a correlator. The correlation of the signals provided by the two detectors is measured. It depends on the coherence of the radiation falling on the two detectors. The angular diameter of the fixed star can be calculated from the course of this correlation as a function of the distance of the detectors, making the assumption that the fixed star appears as a circular disc. Objects the intensity distribution of which cannot be assumed to be a circular disc (for example unknown objects) can be covered by such an arrangement only very partially.

It is the object of the invention to provide an instrument for recognizing very far away objects, which practically can no longer be resolved with conventional means of optics and radiate electromagnetically incoherently (for example thermally) said instrument being not affected by mechanical movements of the object relative to the instrument or such apparent movements due to atmospheric refraction.

Furthermore, recognition of remote objects is to be made possible without excessive optical and mechanical expenditure.

Starting from a device defined in the beginning this object is achieved in that the target object measurement circuit comprises
(c) a plurality of correlators each one of which correlates the signals of one pair of detectors with each other, and
(d) means for comparing a pattern formed by the correlation values to patterns of the same kind of known objects.

Thus the "pattern" generated is not the optical image of the object but a pattern which results from the correlations of the various detector signal pairs. This pattern, which does not correspond to an optical image of the object but, as will be shown hereinbelow, to points of the Fourier transform of the autocorrelation function of the image brightness, can also serve to associate the object observed with a certain class of objects by comparison with corresponding patterns of known objects, and, in this sense, to "recognize" it. The pattern thus obtained offers the further advantage that it is invariant against relative movements of object and instrument, provided the object remains within the field of view of the instrument. Thus, object recognition is not impaired by movements of the instrument nor by light refraction, which causes apparent movements of the object within the field of view. When the detectors are arranged appropriately, high resolution can be achieved, which otherwise could be obtained only with optical instruments having a very large diameter of the aperture. Nevertheless, with a device of the invention, the demands with respect to mechanical precision of the assembly are relatively low.

Modifications of the invention are subject matter of the dependent claims.

An embodiment of the invention is described in greater detail hereinbelow with reference to the accompanying drawings.

Figure 3:
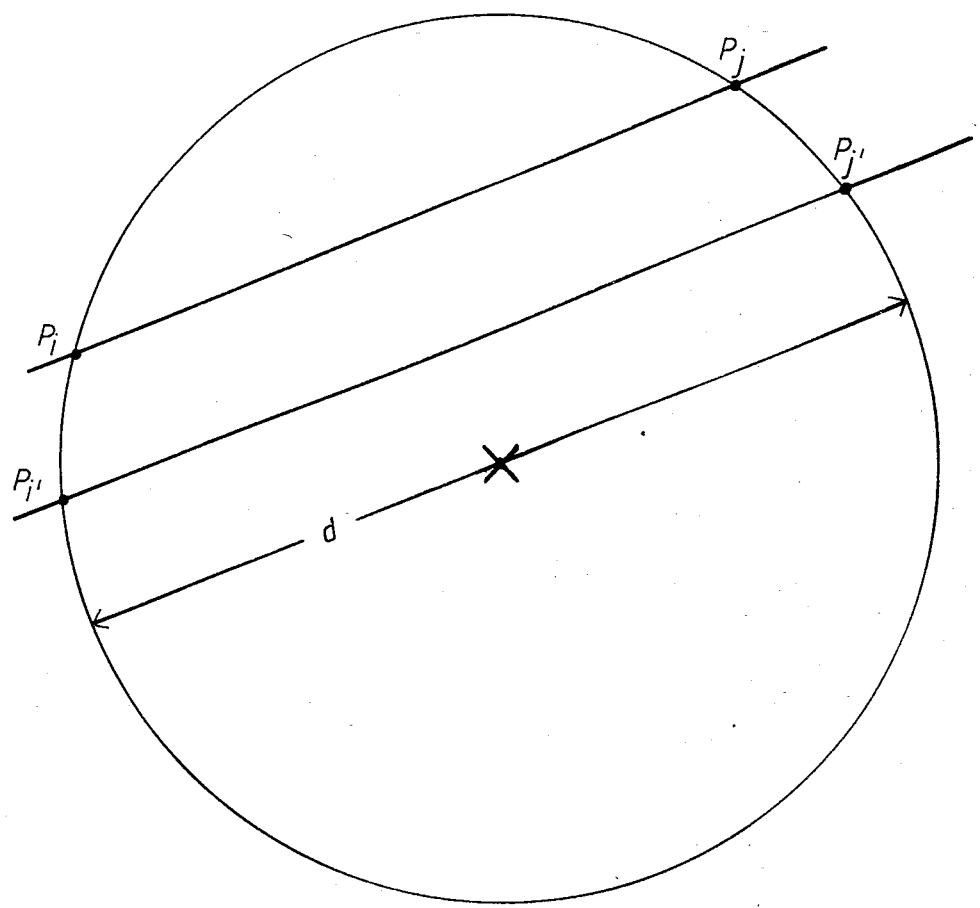

FIG. 3 serves to illustrate certain considerations in the description hereinbelow and shows a circle line on which the detectors are arranged.

Figure 4:
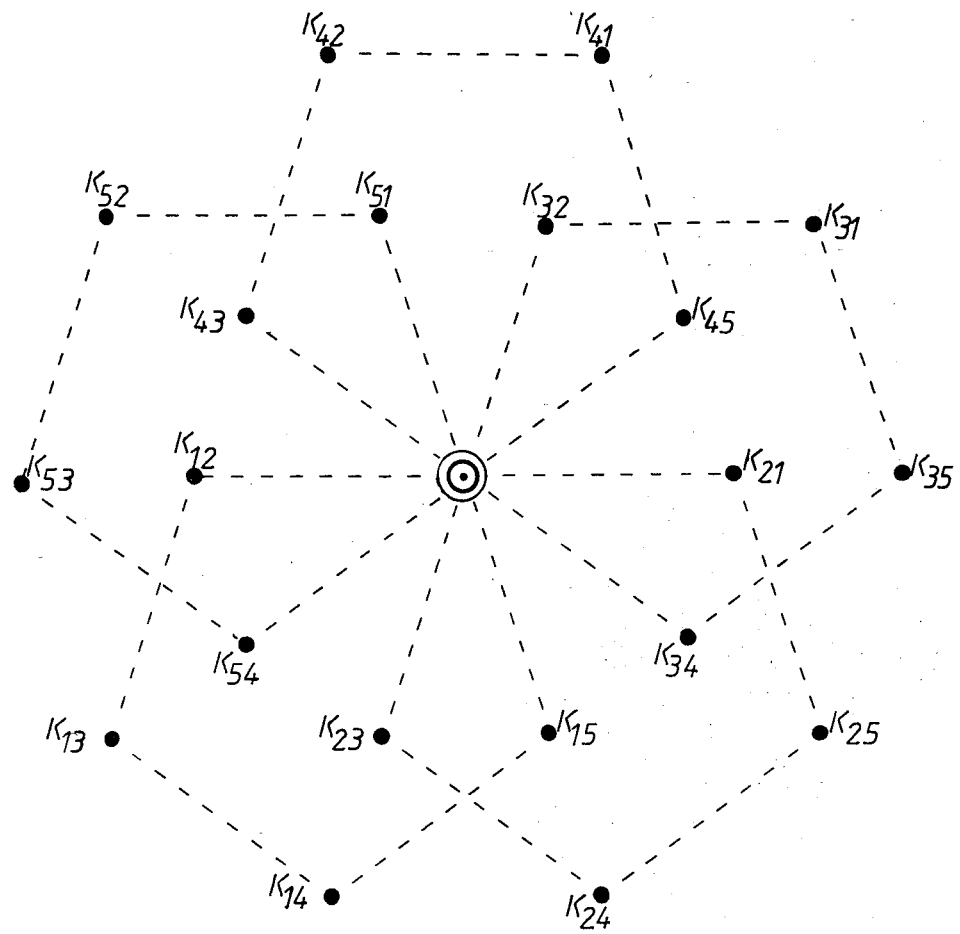

FIG. 4 shows the points $K_{ij}$ for which the values of the Fourier transform of the autocorrelation function of the image brightness have been determined by the correlators also designated by $K_{ij}$.

In the following the device described and comprising detectors and correlators will be designated "electronic lens", because it permits substantial functions of a high resolution lens to be achieved with purely electronic means.

Figure 1:
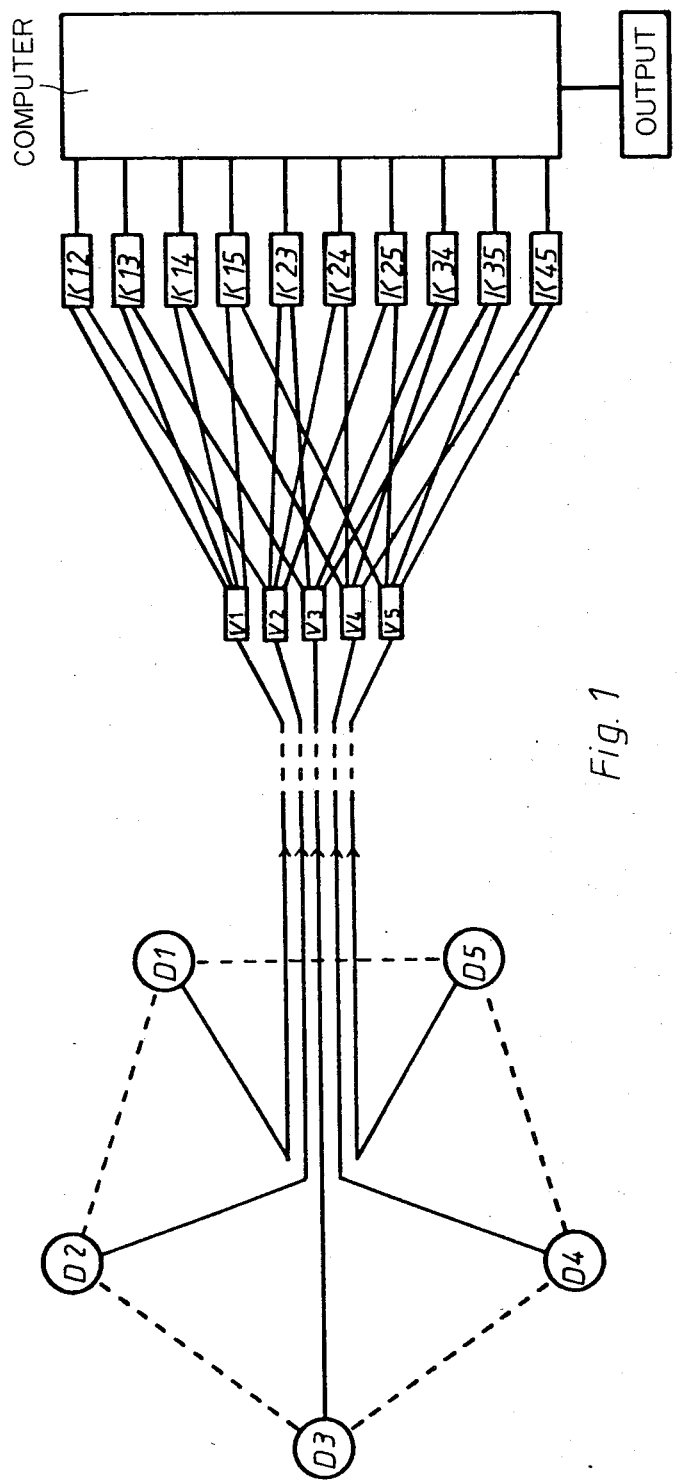
FIG. 1 is a schematic illustration of an "electronic lens" having five detectors located regularly on a circle, each of said detectors being correlated through correlators with each other detector.

The "electronic lens" of FIG. 1 comprises five detectors $D_1$, $D_2$, $D_3$, $D_4$ and $D_5$, all of which receive radiation from an object to be recognized through reflectors or the like. The detectors $D_1$, $D_2$, $D_3$, $D_4$ and $D_5$ are arranged on a circle in regular array such that they form the corners of a notional pentagon, indicated in dashed lines in FIG. 1.

The signals from the five detectors amplified by distributors and amplifiers $V_1$ to $V_5$ are then applied to $n(n-1)/2=10$ correlators $K_{12}, K_{13}, K_{14}, K_{15}, K_{23}, K_{24}, K_{25}, K_{34}, K_{35}$ and $K_{45}$ such that the signals of each detector $D_1$ to $D_5$ are correlated with the signals of each other detector. Thus ten correlation signals $Q_{ij}$ are generated, which form a "pattern" of correlation values that is applied to a computer. The computer compares the pattern with corresponding patterns of known objects and thus leads to coordination of the object observed with a certain class of objects, for example certain aircraft at a certain distance and at a certain aspect angle, which coordination is output as result, as indicated in FIG. 1.

FIG. 4 shows an illustrative inderpretation of the "pattern". If points $K_{ij}$ are coordinated with the pairs $(D_i, D_j)$ of detectors of FIG. 1, as illustrated in FIG. 4, the point $K_{41}$, for example, being coordinated with the same signal as the point $K_{14}$ supporting points of the Fourier transform $\tilde{A}(u,v)$ of the autocorrelation function of the intensity distribution $I(x,y)$ in the object plane are obtained.

Figure 2:
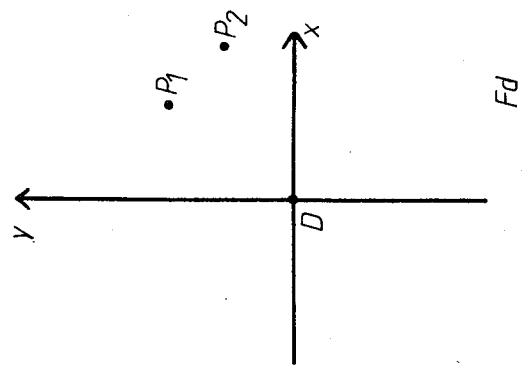
FIG. 2 illustrates the position of the object and detector planes and illustrates the designations used in the specification.
Figure 2:
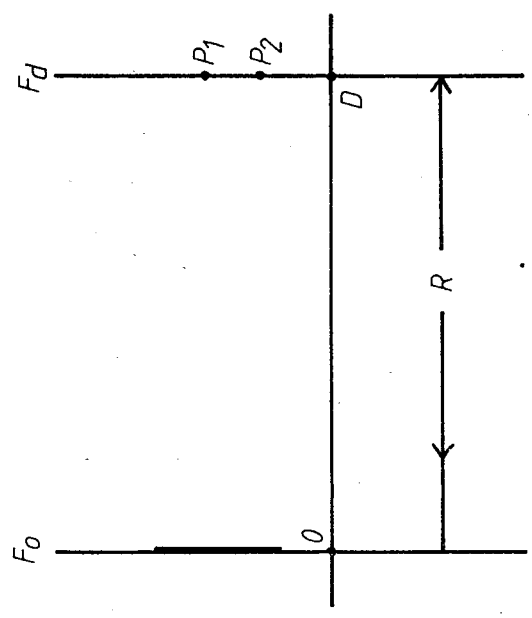
Figure 2:
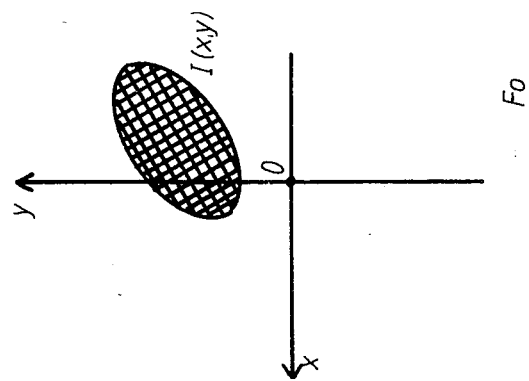

FIG. 2 shows the object plane $F_o$ with the coordinate x and y and the detector plane $F_d$ with the coordinates X and Y. An object is located in the object plane and provides an intensity distribution $I(x,y)$. In the detector plane, detectors are located in the points $P_1, P_2, \ldots, P_5$. ... The distance between object plane $F_o$ and detector plane $F_d$ is R.

The invention is founded on the following physical basis: The essential measuring quantities of the method are the amounts of the mutual complex degrees of coherence ("Principles of Optics", 2nd Edition M. Born and E. Wolf. Publishers Pergamon Press, London 1964) $|\gamma(P_i,P_j)|$ in the pairs $P_iP_j$ of points of the detector plane $F_d$ (see FIG. 2) occupied by detectors $D_i, D_j$, said plane, at the same time, defining the "optical" axis DO of the system, i.e. the normal through any selected origin D in the plane $F_d$. In accordance with the theorem of van Zittert and Zernike, $|\gamma(P_i,P_j)|$ is defined substantially by the Fourier transform $\tilde{I}(u,v)$ of the intensity distribution $I(x,y)$ in the object plane $F_o$. $F_o$ is defined as the plane through the object perpendicular to the optical axis DO, the origin O being the intersection of this optical axis with this object plane. More accurately holds good $$|\gamma(P_i,P_j)| = \frac{|\int dx \int dy\, I(x,y)\exp(-ik(px+qy))|}{\int dx \int dy\, I(x,y)} \quad (1)$$

with $$p := |X_i - X_j|/R,\, q := |Y_i - Y_j|/R. \quad (2)$$

Therein $(X_i, Y_i)$ and $(X_j, Y_j)$ are the coordinates of the points $P_i$ and $P_j$ with respect to a cartesian coordinate system in the detector plane $F_d$ with the origin D. x,y are the coordinates of a point in the object plane $F_o$ with respect to a cartesion coordinate system with the origin O, the axes of this latter coordinate system being parallel to the coordinate axes of the system in the detector plane. R is the distance between object and detector planes. $k = 2\pi/\lambda$ designates the length of the wave vector, $\lambda$ designates the wavelength of the light utilized, which is assumed to be substantially monochromatic. With $u:=k\,p$, $v:=k\,q$, the integral in the numerator of equation (1) indeed represents the Fourier transform $\tilde{I}(u,v)$ of $I(x,y)$.

If small apertures were provided at the locations of the points $P_i$ and $P_j$, and a screen parallel to the plane $F_d$ were placed behind the plane $F_d$, the quantity $|\gamma(P_i,P_j)|$ can be observed, in principle, as fringe visibility of the generated interference pattern. This principle of interference is, in the end, the basis of all conventional methods of optical imaging by mirrors and lenses up to the highest resolution interference interferometry.

A basically different method for measuring $|\gamma(P_i,P_j)|$ comprises placing detectors at the locations of the points $P_i, P_j$ and correlating the photoelectric currents resulting. This is the idea of the intensity interferometry of Hanburg Brown and Twiss, which because of the elimination of optical pathlength offers the advantage of very low interference susceptibility with nearly unlimited resolution.

The measuring quantity $|\gamma(P_i,P_j)|$ exhibits a number of characteristics which essentially determine the mode of operation of the invention:

Be $I'(x,y) = I(x-x', y-y')$ the intensity distribution of an object $S'$, which is displaced by a vector $(x',y')$ relative to the object S having the intensity distribution $I(x,y)$. Then holds good, for the displaced object $S'$:

$$|\gamma(P_i,P_j)| = \frac{|\int dx \int dy\, I'(x,y)\exp(-ik(px+py))|}{\int dx \int dy\, I'(x,y)} \quad (3)$$

$$= |\exp(-ik(px'+py'))| \times$$

$$\frac{\int dx \int dy\, I(x-x',y-y')\exp(-ik(p(x-x')+q(y-y')))}{\int dx \int dy\, I(x-x',y-y')}$$

Now $x:=x-x'$ and $y:=y-y'$ are introduced as new integration variables. As the factor in front of the integral has no effect on the integral because of the absolute-value signs, comparison with equation (1) yields $$|\gamma'(P_i,P_j)| = |\gamma(P_i,P_j)| \quad (4),$$

or, with other words: Any displacement $(x',y')$ of an objects S in the object plane $F_o$ does not affect the measured quantity $\gamma(P_i,P_j)$. As $\gamma(P_i,P_j)$ depends only on the differences $|X_i-X_j|$, $|Y_i-Y_j|$, also the following statement is true: Displacement of any pair of detectors in the detector plane $F_d$, such that direction and distance from $P_i$ to $P_j$ remain the same, has no influence on the measured quantity $|\gamma(P_i,P_j)|$.

If equation (1) is squared and the denominator of the right side is transferred to the left side, the right side, with $u:=k.p$, $v:=k.q$, becomes the Fourier transform $\tilde{A}(u,v) = |\tilde{I}(u,v)|^2$ of the autocorrelation function $$A(x,y) = \int dx' \int dy' I(x',y'-y)\, I(x',y') \quad (5)$$

of the intensity distribution $I(x,y)$ in the object plane. As the left side of the equation contains measured quantities only, the denominator being only an insignificant constant, which can be measured if necessary, the autocorrelation function $A(x,y)$ can be measured completely in the ideal case of a "dense" coverage of the detector plane.

A "dense coverage" of the detector plane is, however, not necessary herefor, as the following example shows: Only the points P on a circular line having the diameter d be covered "densely" by detectors, and at first only the pairs of detectors on the end points $P_i, P_j$ of a family of parallel chords be correlated (see FIG. 3). As apparently all detector distances between o and d occur as the parallel offset of the correlated pairs is of no relevance, these pairs of detectors provide the same measured values as the totality of all detector pairs which could be accommodated on the largest chord, i.e. on the circle diameter parallel to the considered family of chords. These detector pairs, however, in accordance with equation (2) provide the values $\tilde{A}$ (u,v-

$)=\tilde{A}(kp,kq)$ for the points $(u,v)$ on a line interval of the length $2dk/R$ and parallel to the family of chords in question. The factor 2 results from the symmetry $\tilde{A}(u,v)=\tilde{A}(-u,-v)$, which apparently signifies that each detector combination provides two support points of the function $\tilde{A}(u,v)$ with function values. If, eventually, each point of the circular line is correlated with each other point of the circular line, thus if all possible families of chords are considered, obviously the values of the function $\tilde{A}(u,v)$ are obtained for all points $(u,v)$ out of the area of a circle having the diameter $2kd/R = 4\pi d/\lambda R$. Thus dense coverage of the circumference of the circle by detectors provides the same measured values as a dense coverage of the interior of the circle. The latter would merely provide the same measured values redundantly.

Of course "dense" coverage of a line or moreover of an area with detectors is technically impossible. With a finite number of n detectors, only the real and not negative values $Q_{ij}$ of the Fourier transform $\tilde{A}(u,v)$ of $A(x,y)$ in a maximum of $n(n-1)$ supporting points $(u,v)=k(p,q)$ is obtained, $p=p(i,j)$, $q=q(i,j)$ being related to the locations $P_i, P_j$ of the detectors by equation (2) and the symmetry $\tilde{A}(u,v)=\tilde{A}(-u,-v)$ being taken into consideration. With symmetric arrangement of the detectors, the supporting points may coincide partially, i.e. the respective function value is measured redundantly. An example would be six detectors in the corners of a regular hexagon. Degeneracy of this type can, for example, be avoided by selecting n as a prime number. Thus, for example, the case $n=5$ in FIG. 4 provides 20 different support points, whereas a regular hexagon provides 18 different support points of which 12 are doubly degenerated.

Such degeneracies permit automatic adjustment of the detectors independent of the scene observed. The detectors may, for example, be modified by a computer until all redundantly provided correlation values actually become equal within set tolerances. It depends on the purpose which the instrument is to serve, whether this advantage makes up for or even overcompensates the disadvantage of a smaller number of different measured values.

FIG. 4 shows as example the support points $(u,v)$ —in arbitrary units—for which an array of five detectors as shown in FIG. 1 would provide the function values $\tilde{A}(u,v)$.

Thus the values $O_{ij}$ of the function $\tilde{A}(u,v)$ in said $n(n-1)$ supporting points $(u,v)$ represent the "information" which can be gathered with the described arrangement of n detectors. The information content of such a measurement is certainly smaller than that of a conventional, monochromatic image of the same resolution. Because of the high resolution of the device, which substantially corresponds to the resolution a lens having comparable diameter, this reduced information can often be achieved in situations, where a conventional image can no longer be generated. If the object is known, the reduced information will generally suffice to determine its distance.

Unknown objects can be classified in accordance with object classes. The distinguishable classes are to be defined by the present method. Optically, objects in the core field of application of the proposed method, namely in situations beyond the practical use of the necessary lens or mirror systems, would define only one class, namely the "class of the non-resolvable point objects". The invention permits classification going beyond this within this otherwise no longer resolvable class of objects.

Furthermore the invention can be used in fields, where though optically imaging systems, on principally, would be available, they cannot be used, for example, for lack of ruggedness or stability. An example is a high-resolution telescope aboard a helicopter. This gain results from the elimination of optical light paths in systems on the basis of wave interferences, which light paths are susceptible to disturbances.

Also the following characteristics are worth considering: If an image is formed by means of conventional lens or mirror systems, no object displacements $(x',y')$ the image contributions of which is larger than the Airy disc defined by the finite resolution must occur during exposure. Otherwise a blur due to double printing of the offset images would be added to the natural blur due to finite resolution. The total image would be "blurred". Equation (4) says that such a blurring, either due to genuine movement of the object itself or due to apparent movement because of lack of stability of the optical axis, or due to both these influences at the same time is not possible for physical reasons with the new method of information gathering. Though also here object informations from different time intervals $(t_1, t_1+dt)$, $(t_2, T_2+dt)$ within the exposure time $T_1 \leq t_1 < t_2 \leq T_2$ are "double printed". Time-dependent displacements $x'=x'(t)$, $y'=y'(t)$, however, which cause blurring with imaging optical systems, affect the result of the measurement only as the insignificant phase factor in equation (3), thus theoretically not at all.

Therefrom the independence of turbulent atmospheric disturbances results, which has been mentioned in the beginning: If the light beam coming from the object passes through areas having variable refraction coefficient $n=n(x)$, it will be "distorted" by refraction. The object is apparently displaced in uncontrollable manner. This is the reason for the scintillation of the stars, which is caused by small, quickly variable turbulences in atmosphere and reduces the actual resolution of astronomic instruments far below the resolution inherent in the instrument. Disturbances of this kind have no influence on the result of the measurement of an arrangement of the type described.

Furthermore no particular care has to be taken to accurately track the object with the optical axis of the instrument. Though the object has to be permanently within the field of view of the instrument, it needs not be kept on the optical axis. This is of particular importance, because the coaching apparatus, which takes care of the tracking, usually has lower resolution and therefore would not be in the position to guide the optical axis with the accuracy, which would be required for a higher resolution conventional image.

Therefrom results, inversely, that the proposed device is not able to determine the position of the object more accurately than the coaching apparatus. The device, so to say, distinguishes between "position" and "object" informations. This is a certainly remarkable difference from conventional images.

Eventually, an important feature of the invention is the simultaneous correlation of the photoelectric currents. This permits considerable reduction of measuring time. Furthermore the generation of image-like two-dimensional object information permits, in addition, a considerable reduction of the necessary signal-to-noise ratio of the individual measurement, thus of the measured value $Q_{ij}$ from the individual correlator $K_{ik}$. Low signal-to-noise ratios may, namely, be compensated by intelligent signal processing, which re-constructs the true object information from a heavily noisy image. As has been mentioned before, the evaluation of the object information will be made by computers anyhow, as the outstanding human capability to recognize shapes, which has been developed with regard to optical images, can be used, at the most, indirectly, when information generated according to the invention is to be evaluated.

The advantages of color vision, i.e. the simultaneous gathering of object information in different ranges of the electromagnetic frequency spectrum, can be transferred completely also to the information gathering system of the invention. When the system is used within the infrared range, this may, for example, be done in the spectral ranges within the known atmospheric windows.

I claim:

1. Method of recognizing, at distances beyond the resolution of optical imaging systems, randomly shaped objects from which electromagnetic radiation emanates, comprising the steps of
   (a) two-dimensionally arranging, in fixed relative positions, a plurality of detectors responding to radiation of an object, each of the detectors representing a discrete point of no particular shape,
   (b) providing a known object at a large distance from said detectors,
   (c) exposing each detector directly to radiation emanating from said known object toward said detector, whereby said detectors provide first signals indicative of said radiation from the known object,
   (d) correlating said first signal provided by each detector with each one of first signals provided by a plurality of associated other ones of said detectors to provide a first pattern of correlation signals indicative of said known object,
   (e) storing said first pattern of correlation signals,
   (f) exposing each detector directly to radiation emanating from an unknown object towards said detector, whereby said detectors provide second signals indicative of said radiation from the unknown object,
   (g) correlating said second signal provided by each detector with each one of second signals provided by said plurality of associated other ones of said detectors to provide a second pattern of correlation signals indicative of said unknown object, and
   (h) comparing said second pattern with said stored first pattern to determine whether said known and unknown objects are similar.

2. A device for recognizing, at distances beyond the resolution of optical imaging systems, randomly shaped objects from which electromagnetic radiation emanates, comprising
   (a) a plurality of detectors ($D_1 \ldots D_n$) responding to radiation of an object and arranged two-dimensionally in fixed relative positions, each of the detectors representing a discrete point ($P_1 \ldots P_n$) and having no particular shape,
   (b) means for exposing each detector directly to radiation emanating from a known object, whereby said detectors provide first signals indicative of radiation from said known object, said means for exposing including a target object measurement circuit,
   (c) means in said target object measurement circuit to correlate the first signal provided by each said detector with each one of the first signals provided by a plurality of associated other ones of said detectors to provide a first pattern of correlation signals indicative of a known object,
   (d) storage means for retaining said first pattern of correlation signals,
   (e) means for exposing each said detector directly to radiation emanating from an unknown object toward each said detector, said detectors providing second signals indicative of radiation from the unknown object,
   (f) means in said target object measurement circuit to correlate said second signal provided by each said detector with each one of said second signals provided by the other of said detectors to provide a second pattern of correlation signals indicative of the unknown object, and
   (g) means in said target object measurement circuit to compare said second pattern with said stored first pattern to determine any relationship between said first pattern of correlation signals and said second pattern of correlation signals.

3. Device as claimed in claim 2, characterized in that the detectors ($D_1, D_2, \ldots, D_n$) are located on a circle.

4. Device as claimed in claim 3, characterized in that the detectors ($D_1, D_2, \ldots, D_n$) are located in the corners of a regular polygon.

5. Device as claimed in claim 4, characterized in that the number n of the detectors ($D_1 \ldots, D_n$) is a prime number larger than 2.

6. Device as claimed in anyone of the claims 2 or 3 through 5 characterized in that a plurality of similar arrays of detectors are provided which operate in different frequency ranges of the incident electromagnetic radiation.

7. Device as claimed in claim 5, characterized in that five detectors ($D_1, D_2, D_3, D_4, D_5$) are located in the corners of a regular pentagon.

8. Device as claimed in anyone of the claims 2 or 3 through 7, characterized in that one correlator ($K_{ij}$) is provided for each possible combination of detectors ($D_i, D_j$), the signals from the detectors of this combination being applied to said correlator.

9. Device as claimed in claim 8 characterized in that a plurality of similar arrays of detectors are provided which operate in different frequency ranges of the incident electromagetic radiation.

10. Device as claimed in claim 4, characterized in that
    (a) the number (n) of the detectors has at least one divisor 2 such that certain correlation values are formed redundantly,
    (b) means are provided for detecting deviations of redundantly formed correlation values, and furthermore
    (c) means are provided for determining the detector by which these deviations have been caused.

11. Device as claimed in claim 8, characterized by means for adjusting such a detector responsible for said deviations until the redundantly formed correlation values are equal.

* * * * *